United States Patent
Lindenthal

[11] Patent Number: 6,148,981
[45] Date of Patent: Nov. 21, 2000

[54] DRIVE SYSTEM FOR THE TRANSMISSION OF POWER FROM A POWER SOURCE TO A PLURALITY OF OUTPUT TRAINS

[75] Inventor: Hans Lindenthal, Heidenheim, Germany

[73] Assignee: Voith Turbo GmbH & Co., KG, Heidenheim, Germany

[21] Appl. No.: 09/284,092
[22] PCT Filed: Oct. 8, 1996
[86] PCT No.: PCT/EP96/04361
§ 371 Date: Jun. 28, 1999
§ 102(e) Date: Jun. 28, 1999
[87] PCT Pub. No.: WO98/15750
PCT Pub. Date: Apr. 16, 1998
[51] Int. Cl.[7] .......... F16D 48/06; F16D 43/286; F16D 1/08
[52] U.S. Cl. .......... 192/56.3; 192/88 B; 192/150
[58] Field of Search .......... 192/56.3, 88 B, 192/150; 464/30, 32; 403/5

[56] References Cited

U.S. PATENT DOCUMENTS

| | | | |
|---|---|---|---|
| 3,686,919 | 8/1972 | Brusa | 72/249 |
| 4,264,229 | 4/1981 | Falk et al. | 403/5 |
| 4,635,769 | 1/1987 | de Hertel Eastcott . | |
| 4,662,492 | 5/1987 | Troeder . | |
| 4,752,275 | 6/1988 | Lindenthal et al. | 464/32 |
| 4,944,377 | 7/1990 | Elsner | 192/56.3 |
| 4,982,617 | 1/1991 | Munker et al. | 192/88 B X |
| 5,051,018 | 9/1991 | Appell et al. | 403/5 |
| 5,407,046 | 4/1995 | Kawasaki | 192/56.3 |

FOREIGN PATENT DOCUMENTS

| | | | |
|---|---|---|---|
| 29 23 902 A1 | 6/1979 | Germany | F16D 1/08 |
| 40 28 158 A1 | 3/1991 | Germany | F16D 7/02 |
| 41 12 484 A1 | 10/1992 | Germany | F16D 1/08 |

*Primary Examiner*—Rodney H. Bonck
*Attorney, Agent, or Firm*—Taylor & Aust, P.C.

[57] ABSTRACT

A drive system for the transmission of power from a drive source to a plurality of output trains includes a transfer gear connected upstream of the output trains, and an arrangement for ensuring that the output trains are not overloaded with torque. The arrangement includes a safety clutch with a basic clutch body for the frictionally engaged connection of two machine parts, and at least one thin-walled sleeve which forms a wall of an annular chamber upon which pressure medium can act. The arrangement further includes at least one feed line which extends through the clutch body to the annular chamber and can be closed off in an air and fluid-tight manner by use of closure elements. The arrangement finally includes a pressure-relief mechanism. The safety clutch is arranged upstream of the transfer gear. The pressure-relief mechanism is coupled to an arrangement for detecting the torque at the output trains and/or a magnitude which is proportional to the torque and is associated with each output train, and/or an influencing quantity in the area surrounding the machine. The clutch includes a device for activating the pressure-relief mechanism when the torque and/or a magnitude proportional to the torque and/or an influencing quantity is/are exceeded.

20 Claims, 5 Drawing Sheets

DRIVE SYSTEM FOR THE TRANSMISSION OF POWER FROM A POWER SOURCE TO A PLURALITY OF OUTPUT TRAINS

BACKGROUND OF THE INVENTION

1. Field of the Invention

The present invention relates to a drive system designed to transfer power from a power source onto a plurality of drivetrains.

2. Description of the Related Art

Many industrial drive system concepts are based on the distribution and transfer of power, originating from a power source onto several power consumers, which are positioned downstream of the power consumer. A significant area of application of such a drive system concept are roll mills. The power developed by a motor is transferred via drivetrains onto several working rolls. For that purpose, a transfer gearbox is connected ahead of the drivetrains. The transfer gearbox includes in its simplest form only several spur gears, which are positioned in a manner that allows the transfer of power onto the downstream positioned universal drivetrains in accordance to the ratio of the spur gears. The drivetrain can further include apparatuses for torque and speed amplification. Disturbances on the driven equipment cause an interruption of the torque transfer from the driving to the driven system, resulting in an unacceptable increase in torque. In roll mills, these types of disturbances manifest themselves as jams during the rolling process. The cause of such jams is primarily a result of a lamination of the rolling stock, the use of cold rolling stock, or a fracture of the roll. The reason for such an unacceptable increase in torque is the continued propulsion of the masses in spite of the disturbances on the driven side of the drivetrain. This manifests itself in a deformation of the drivetrain, which can lead to torsional fractures in extreme cases. In order to avoid such failures, as well as prevent the unacceptable torque increase, special and quickly separable safety couplings are available for the transfer of torque between two mechanical components on the same axis. An exemplification of such a coupling, including an overload safety device, designed to prevent excessive torque spikes, is published in the German paper DE-OS-29-23-902. The coupling includes at least one thin-walled sleeve, forming a wall of a ring-shaped chamber extending in axial direction. The ring-shaped chamber can be pressurized with a medium in order to elastically deform the sleeve in radial direction causing it to jam against the surface of an element onto which the coupling is mounted. Adjacent to the ring-shaped chamber are drillings, which are a part of a safety or coupling relief device. As a result of the relative motion between the surfaces and the actions of the relief device, the pressurized medium residing in the ring-shaped chamber can escape through the drillings, thus lowering the pressure inside the chamber.

To transfer a certain torque level, a certain surface pressure is required. For that purpose, oil is pumped into the chamber, which is needed to deform the respective machine components relative to one another. In this way, the coupling is adjusted to the desired torque capacity. If, during an overload condition, this torque is exceeded, the coupling slips. The maximum torque level that can be transmitted reduces because the effective, static friction coefficient transitions into the sliding friction coefficient. There is a relative motion in circumferential direction between the individual elements of the two machine components, which are jammed relative to one another. A shear disk mounted on one machine component shears off a shear valve, opening the connection to the ring-shaped chamber of the coupling. After shearing off the shearing valve (or valves), the pressurized oil can freely expand and the torque to be transmitted reduces to zero within a few milliseconds. Such couplings are placed in a sensible manner in areas of possible disturbances.

For an application in a roll mill, the safety coupling must be positioned near the rolls. This, however, is not always feasible, which is why such a safety coupling must be mounted either in every universal drivetrain or immediately ahead of every universal drivetrain. This disadvantage of such an arrangement of safety couplings in a drivetrain, especially in an application such as a roll mill, is the high cost, since every universal drivetrain or branch of a power take-off is assigned a safety coupling. Furthermore, there is a direct relationship between the size of the safety coupling and the torque to be transmitted. Higher torque levels require a larger diameter safety coupling, which is met by limitations as a result of the placement of the universal drivetrains or the individual power take-offs, as well as their center-line distances to one another.

SUMMARY OF THE INVENTION

The present invention provides a drive system of the type mentioned in the introduction, which avoids the disadvantages. An overload safety device for preventing a torque overload condition is cost-effective, easy to manufacture, as well as fast-responding. The overload safety device for preventing a torque overload condition is effective at torque levels that are only minimally above the maximum allowable torque. The magnitude of the maximum allowable torque to be transmitted is adjusted so that, if this torque is exceeded, the torque transmission can be quickly disrupted. Furthermore, the overload safety device designed to prevent a torque overload condition offers a rapid response time, i.e., a short period of time between the occurrence of an unacceptable high torque level and the interruption of the torque transmission.

The overload safety device is a cost-effective solution with respect to the construction and function, including only a small number of relatively simple components. The entire arrangement is characterized by low manufacturing and assembly costs, as well as by minimum effort required to reset the coupling after a triggering event, i.e., after an interruption of a torque transmission.

By placing the safety coupling—including a coupling body to frictionally engage two machine components and a relief mechanism—upstream from the transfer gear box, only one coupling is required to protect against a torque overload condition. The relief mechanism cannot be designed as described in German document DE-OS-29-23-902, but the relief mechanism must be designed to operate at a faster response time. This response time should correspond to a fraction of the natural frequency of the drive system in order to avoid deformations in the drivetrain. This is accomplished by use of an external relief method, i.e., by directly or indirectly controlled opening of the supply drillings. To disrupt the torque transfer at relatively low torque spikes on the individual power take-offs, especially the universal drivetrains, an appropriate relief mechanism is provided, which is connected to a torque sensing/acquisition device assigned to every universal drivetrain, and/or a device to capture a value proportional to the expected torque value, and/or a device to capture a disturbance value originating in the vicinity of the machine and affecting the operation of the machine.

The safety coupling is a remote operated coupling, which is triggered in response to a predetermined value for the current torque value, and/or a characteristic value proportional to the torque, and/or the occurrence of a disturbance value. In terms of the triggering method, there are several possibilities that should be considered: sensing of the torque of each power take-off, especially of each universal drivetrain, and/or sensing of a value proportional to the torque on the individual power take-offs (for example: the roll forces, speed differences observed in a roll mill), and/or sensing of parameters of the materials to be processed which are indirectly proportional to the torque value (in roll mills—temperature and thickness of materials) and/or the capture of the disturbance value impacting the manufacturing process of the machine in a retroactive fashion (for example: vibration in the foundation).

The determined values can be compared to a not-to-be-exceeded command value in order to generate a signal to control the relief mechanism by use of a control device. A mechanical device is also feasible.

As far as the possibilities to trigger the relief mechanism, there are a plurality of possible variations. The relief mechanism includes, for example, a shear device to separate the shear valve, which keeps the pressurized medium from escaping from the ring-shaped chamber of the coupling. The shear device is mounted in a freely rotatable manner relative to the coupling body, including at least one thin-walled sleeve forming a wall of the pressurized, ring-shaped chamber. The mounting is designed so that the shear device is rotating together with the drivetrain nearly without difference in rotational speed in relation to the shear valves. The coupling between the relief mechanism and the speed-sensing/acquisition device of each universal drivetrain works on the basis that when the maximum allowable torque and/or a characteristic value, proportional to the maximum allowable torque is exceeded, or at the occurrence of a disturbance value, the shear device is reduced in speed. Because of the resulting rotational speed difference, the shear valves are sheared off in response to the relative circumferential motion difference between the shear device and the shear valves, causing a relief of the pressurized medium in the ring-shaped chamber. The force or torque transfer is therefore disrupted.

Another possibility is to include at least one machine element in the relief mechanism, including an explosive substance which, in the event of an overload condition, is triggered to explode, allowing the supply drilling to open. The explosive substances are either solid, liquid, or viscid substances or substance mixtures which, after ignition by sparks, flames, or impact, etc., rapidly release large amounts of compressible gases, causing destructive effects in its immediate surroundings. For the triggering and relief of the coupling and the storage of the explosive substance, there are at least two possibilities. The triggering can occur directly, i.e., the explosive substance is integrated directly in the sealing valves and ignited there. The triggering by the machine element carrying the explosive substance can occur indirectly, i.e., the relief mechanism includes a shear device. The explosive substance is applied to "connectors" and is activated at the site of the shear device.

The basic principle, according to this invention, is the placement of a cost effective safety coupling—designed to prevent a torque overload condition—and the design of the appropriate relief mechanism, which is a part of the safety coupling, into a drivetrain whereby the power generated by a power source is distributed onto multiple power consumers.

The shear device, designed in the form of a ring with oblong openings, partially encompasses the shear valves, which usually protrude only minimally above the outer periphery of the coupling body. Shear devices, especially, the shear disk, and the main body of the coupling should both be mounted on the same machine component. The braking or the stopping of the shear device can be accomplished in different ways. The use of a disc brake, drum brake, ratchet mechanism, or the application of systems with pre-loaded springs which can be electro-magnetically released are feasible. From a cost perspective, the simplest solution is the use of a disk or drum brake. The shear device or the shear disk is, in this case, extended in radial direction and includes—along this direction—a working surface for the brake disks. Preferably, the extension in radial direction is chosen to be as large as possible in order to provide the largest possible working surfaces for the brake disks which, in turn, reduces the braking pressures of the disks.

If a ratchet mechanism is used to slow down the shear device or shear disk, the ring has a gear tooth pattern found on the side facing away from the shear valves (in radial direction) as well as on a surface in radial direction. This gear tooth pattern forms the notches for the engagement of a ratchet or a locking pin. The locking pin or ratchet is, in normal operation, held in a fixed position in relation to the machine frame. When the maximum allowable torque is exceeded, a magnet attached to one of the universal drivetrains is activated in order to unlock the ratchet or locking pin and, subsequently, to move the ratchet or locking pin into the notches for engagement.

For the response time, that is, the period of time between the sensing of the unacceptably high torque and the sheering off of the sheer valves, the number of notches or the speed of the movement of the ratchet or locking bolt into the notches is the key factor. Through appropriate design measures, this response time can be optimized. For sensing the torque, or for determining a value proportional to the torque on the universal drivetrain or on the rolls, or for determining the disturbance value, different systems of sensing or capturing these values can be used. The torque sensing and/or the determination of the value proportional to the torque and/or the disturbance value can be accomplished mechanically, electronically, or optically. Mechanical sensing/acquisition devices are based on the strain gage principle or on a mechanical torque measurement device. It is also feasible to use combinations of the various methods for sensing torque.

The coupling of the device, used to measure the torque and/or the value proportional to the torque and/or the disturbance value, to the relief mechanism is best accomplished electronically. Mechanical coupling is feasible; however, it requires precise manufacturing tolerances since the distance between the sensing location and the sheering device is usually very large. The connection between the sensing/acquisition device and the relief mechanism can be accomplished, for example, by use of an electronic control device whose inputs include "torque exceeded" and whose outputs include a signal to slow down the sheer device or to ignite the explosive substance.

Through the placement of the safety coupling ahead of the transfer gearbox, one single safety coupling is sufficient in such a drivetrain to protect against a torque overload condition. The coupling body, whose purpose is to establish a frictional engagement between two machine components, is positioned, corresponding to the torque to be transmitted, ahead of the transfer gearbox. The shear device is activated externally, i.e., not directly through deformation in the drivetrain when exceeding the maximum allowable torque and/or the value proportional to the torque. Thereby, a very cost-effective solution to prevent a torque overload condition in a drivetrain can be realized. The design of such a relief mechanism is done in a manner to achieve the shortest possible response times, i.e. the shortest possible time span between the occurrence of torque spikes and the interruption of the torque flow ahead of the transfer gearbox. The spacing between the drivetrains no longer limits the torque capacity of the safety coupling.

Preferably, the oblong openings of the shear device, especially the shear disks, which encompass the shear valves, are made to different widths. This means that during braking or stopping of the shear disk, the shearing events of the individual shear valves occur sequentially. This has the unique advantage that the shearing forces required to shear off the shear valves are relatively low. The shearing of the shearing valve occurs in a sequential manner, i.e., the shearing of one valve is followed by the shearing of the next valve, which contributes to a substantial improvement in the running smoothness of the drive system. If all valves are sheared off at the same time, relatively high forces are required, which leads to undesirable, high vibration levels in the drive system. The number of shear valves provided on a coupling body and the number of oblong openings in the shear device should be the same. It is, however, feasible to design a shear disk with a certain number of oblong openings in such a way so that it can be adapted to different coupling bodies, resulting in the opportunity to take advantage of the concept of modular construction.

Preferably, all coupling elements, that is, all elements that serve to disrupt the flow of the torque, are made with small masses in order to quickly overcome the inertia of the masses during activation of the relief mechanism.

An embodiment of a safety coupling includes a machine element (i.e, a separator bolt) containing the explosive substance serving to activate the shear device by ignition of the substance. In doing so, conventional shear devices are applied—a shear disk for example, which is placed in a fixed position relative to the coupling body and, when triggered, the ring can be moved in axial or radial direction relative to the coupling body. An additional device to accelerate this relative motion is feasible by the use of pre-loaded springs, for example. There should be at least two separator bolts mounted equally-spaced around the circumference of the driveshaft. The shear device itself can be mounted in a torsionally rigid manner onto the driveshaft, although it should be designed to be moveable in axial direction. One possibility of such an arrangement includes the use of a splined shaft connection between the driveshaft and the shear device. The shear device can also be mounted in a freely rotating manner on the driveshaft. A torsionally rigid connection is not necessarily required, although it appears to be a good solution when applied in combination with a shear disk, since the disk with the respective oblong openings can be designed to accommodate the sealing valves, which are frequently designed in the form of valves.

The separator bolt is coupled with an ignition device, which is activated in response to a signal from the sensing/acquisition device. The sensing/acquisition device should be a control device including at least one input for actual values and one output. The two inputs are each connected to a sensing/acquisition device which determines the current torque value and/or the value which is directly or indirectly proportional to the torque, and/or a disturbance value. The actual value is compared with either a fixed or a calibratable maximum allowable value stored in the control device. If a deviation occurs, a signal is issued at the output of the control device, initiating the triggering of the relief mechanism, or in this case, the ignition of the separator bolt. Since the data transfer, the data comparison, and the triggering of the relief mechanism occurs at the speed of light, such a safety coupling is especially useful for rapid triggering during a torque overload condition or during any other disturbances. The relief mechanism can be triggered immediately upon recognition of a torque spike or even prior to that event. Mechanical sensing/acquisition devices always have some delays in this regard.

A further possibility is to locate the shear device by use of pre-loaded springs or separator bolts (which also need to be ignited) and upon a triggering event, (i.e., the result of an overload condition) an acceleration of the shear device toward the sealing valves takes place. The shear device can be designed so that it interacts with the sealing valves in radial as well as axial direction. The addition of the pretension accelerates the relief action.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 2b is a top view of the relief mechanism of FIG. 2a;

FIG. 3b is a schematic, sectional view of the ratchet mechanism of FIG. 3a;

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
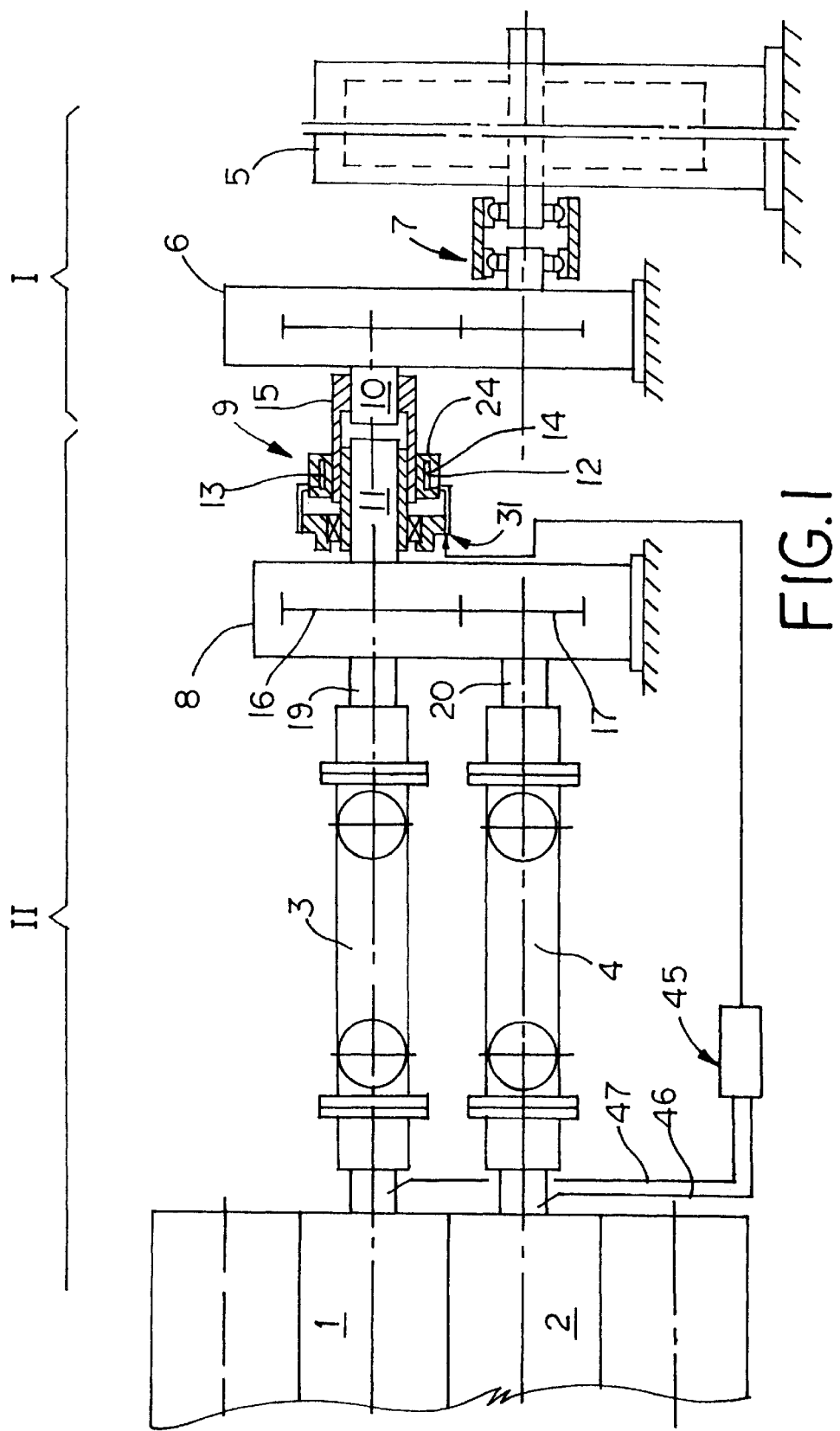
FIG. 1 is a schematic, sectional side view of a safety coupling in a drive system as applied to a roll mill.

Referring now to the drawings and particularly to FIG. 1, there is shown a design of a drive system frequently used in a roll mill application, with at least two universal drivetrains and an integrated device to protect against a torque overload condition. A working roll 1 and a working roll 2 are each driven by a respective universal drivetrain 3 and 4. The power generated by the power source 5 (i.e., an electric motor) is transferred to the universal drivetrains 3 and 4 by use of appropriate speed/torque converters. The connection of motor 5 to the gear reduction unit 6 is accomplished by use of a torsionally rigid coupling 7, which can be designed as a denture clutch. Downstream of the gear reduction unit 6 is a transfer gearbox 8. Transfer gearbox 8 serves to distribute the power to the individual universal drivetrains 3 and 4. Between the gear reduction unit 6 and the transfer gearbox 8, resides the safety coupling 9. Safety coupling 9 serves to—in addition to transmitting torque from the gear reduction unit 6 to the transfer gearbox 8—to protect against a torque overload condition. Safety coupling 9 includes a coupling body 24 and a relief device 31. Coupling body 24 includes at a least thin-walled sleeve 12, forming a wall 13 of a ring-shaped chamber 14 extending in axial direction. Ring-shaped chamber 14 can be pressurized with a medium in order to elastically deform the sleeve 12 in radial direction. The realization of the non-positive connection between the gear reduction unit 6 and the transfer gearbox 8 by use of safety coupling 9 can be accomplished in several ways. For example, flange 15 can be connected to output shaft 10 of gear reduction unit 6 in a torsionally rigid manner. Flange 15 is connected to input shaft 11 of transfer gearbox 8 by use of coupling body 24 in a non-positive manner. Coupling body 24 of safety coupling 9 divides the drivetrain into two parts—a first part I, which is connected to the power source or motor 5, and a second part, which is connected to the power take-off—in this case the working rolls 1 and 2. Transfer gearbox 8 is, in the presented exemplification, designed to include a set of spur gears. These include spur gears 16 and 17. Spur gear 16 is mounted torsionally rigid onto transmission input shaft 11 of transfer gearbox 8. Transmission input shaft 11 is the same shaft as the output shaft 19 of the transfer gearbox 8. Spur gear 17 is mounted torsionally rigid onto a second transmission output shaft 20 of the transfer gearbox 8. Output shafts 19 and 20 of the transfer gearbox 8 are connected torsionally rigid to universal drivetrains 3 and 4.

The relief mechanism 31 can be designed in different ways, as exemplified in FIGS. 2 and 3. Relief mechanism 31 serves to provide a pressure relief in the ring-shaped chamber 14. The activation of the relief mechanism 31 occurs through coupling 45 with the sensing/acquisition devices, in this case the torque sensing/acquisition device 46 and 47 which are assigned to the universal drivetrains 3 and 4. Coupling 45 can be a control device. The torque sensing/acquisition devices 46 and 47 can be of various types. To acquire the torque, mechanically-based torque sensing/acquisition devices can be utilized. These can be designed as published in the brochures by the corporation, "Ringspan". These work on the basic principle that a small torsional deformation is converted into an axial movement by use of a lever system. This axial motion is then converted into a voltage signal proportional to the torque by use of an inductive difference generator. These torque-proportional voltage signals can subsequently function as input signals to a control/regulator unit, which processes these signals into an output signal for the activation of the shear device.

The safety coupling, designed to protect against a torque overload condition, is placed—in the case of a roll mill—between transfer gearbox 8 and gear reduction unit 6. This assures that safety coupling 9 is positioned as closely as possible to the origin of possible disturbances. It is also possible, although not shown here in detail, to integrate the gear reduction unit 6 and the transfer gear box 8 into one unit. Denture clutch 7 would, in this case, no longer be necessary and would be replaced by safety coupling 9. In such a case, the torque flow is disrupted directly between the power source, in this case, motor 5, and the transfer gearbox 8.

Figure 2A:
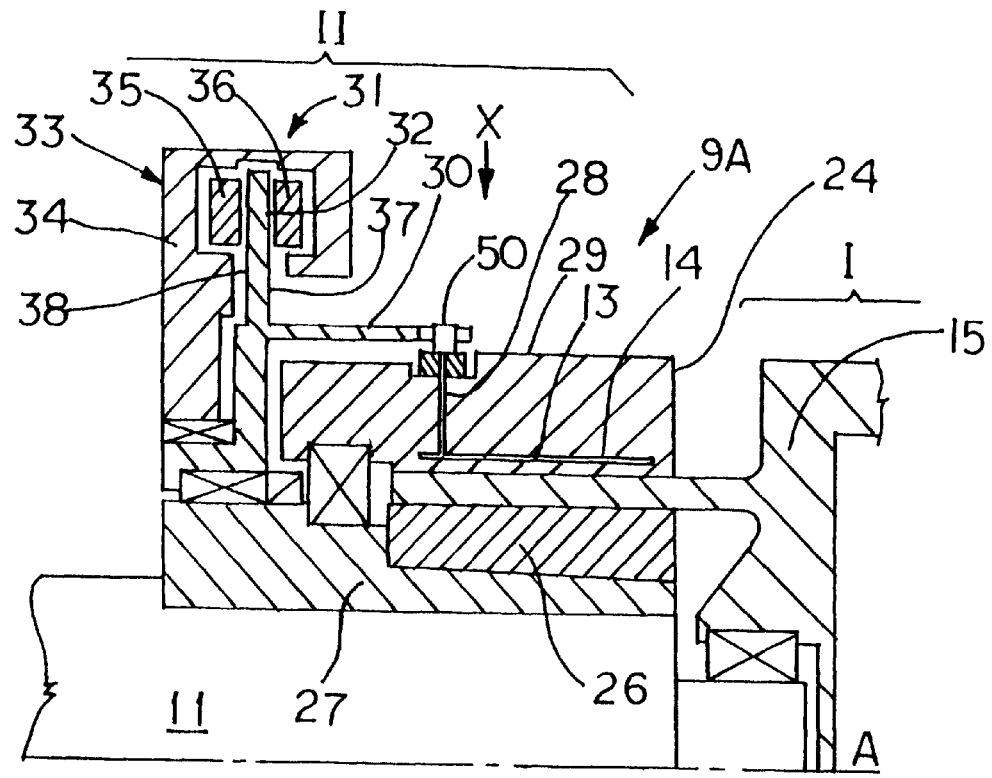
FIG. 2a is a partial, schematic, sectional side view of the relief mechanism of FIG. 1, shown with a disk brake acting upon a shear disk.
Figure 2B:
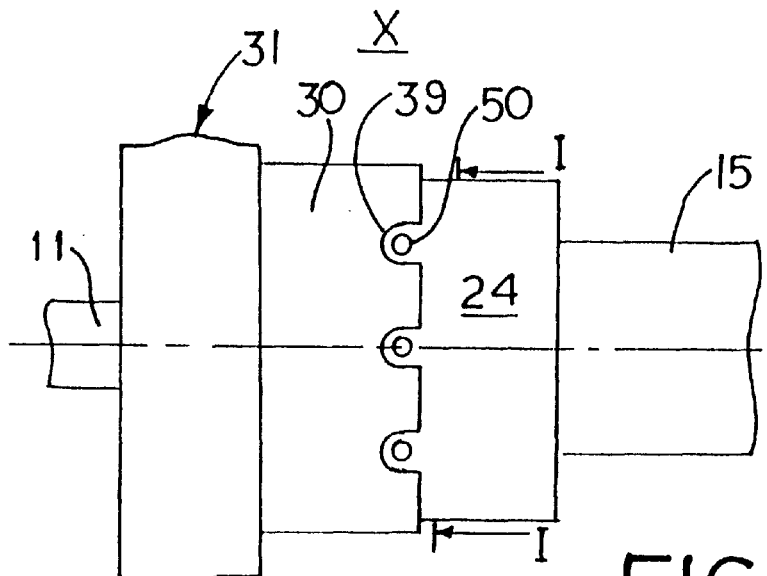

FIGS. 2a and 2b depict, in accordance to this invention, a cross-sectional view of relief mechanism (ref. FIG. 1) for a safety coupling using disk brakes to slow down the shear disk. The labeling used in this illustration is the same as used in the previous illustration. Safety coupling 9a connects the fist part I of drive system with the second part II, through the jamming of flange 15 of the first part of the drive system against bushing 26 and bushing 27, as well as against the transmission input shaft 11 of the transfer gearbox 8 of the second part II of the drive system.

To this end, the ring-shaped chamber 14 is pressurized with a medium. The ring-shaped chamber 14 utilizes supply drillings 28, which reside on the outside 29 of the coupling body 24 and extend in the radial direction to the ring-shaped chamber 14. The supply drillings 28 are sealed by sealing valves, also referred to as shear valves 50. Shear valves 50 protrude only minimally above the outer periphery 29 of coupling body 24. Coupling body 24 is mounted rotatable on bushing 27, which, in turn, is connected torsionally rigid to transmission shaft 11 of transfer gearbox 8. Also mounted on bushing 27 is the shear disk 30 of relief mechanism 31.

Shear disk 30 includes a radial extension in form of a ring 32. Disk brake device 33 is also mounted in a freely rotating manner relative to shear disk 30. All elements of the safety coupling 9a are tied to the axis A, which means that none of these parts are mounted externally on the framework, preventing the transfer of vibration onto the framework. Disk brake device 33 includes a central housing 34 with two disks 35 and 36, which can be pressed against surfaces 37 and 38 of ring 32. The activation of the disk brake device can be electronically controlled. Shear disk 30 comprises oblong openings 39, which partially encompass shear valves 50, as shown in FIG. 2b, view x, as referenced in FIG. 2a. The oblong openings 39 should be open to the side.

When the disk brake device 33 is activated, disks 35 and 36 are pressed against surfaces 37 and 38 of ring 32 and the rotational speed of the shear disk 30 reduces until it comes to a standstill. This creates a relative motion between the oblong openings 39 and the shear valves 50, causing valves 50 to be sheared off. This, in turn, opens the supply drillings 28, relieving the pressure inside chamber 14. The non-positive connection between the first and second part of the drive train is suspended and the torque flow is interrupted.

Figure 3B:
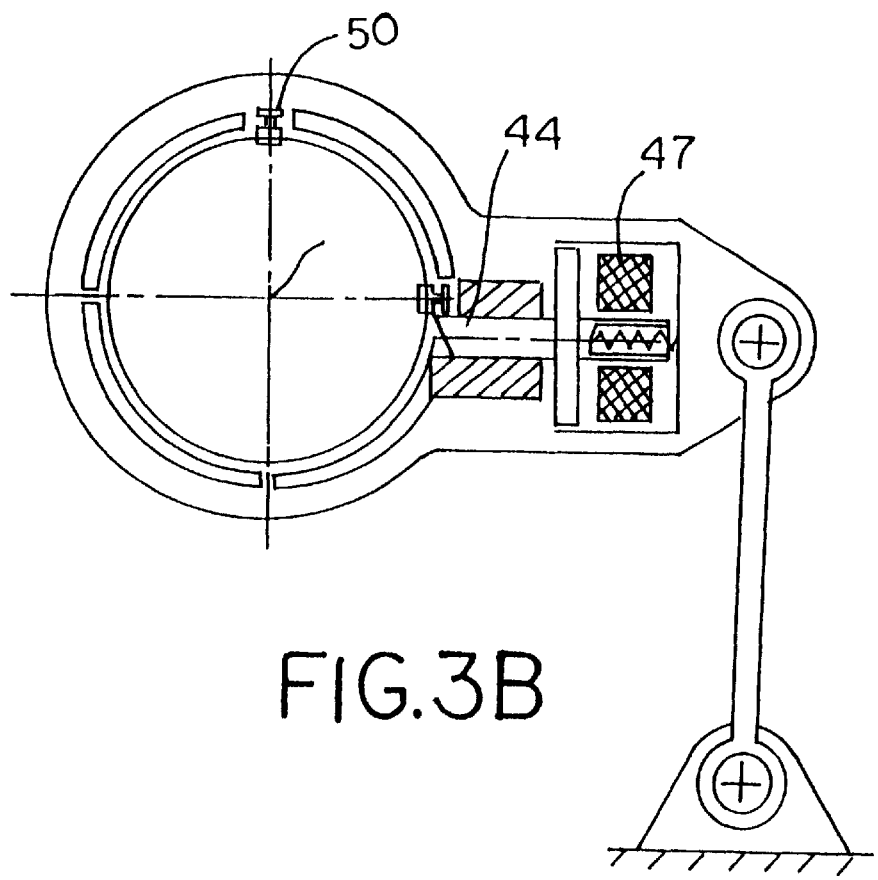
Figure 3A:
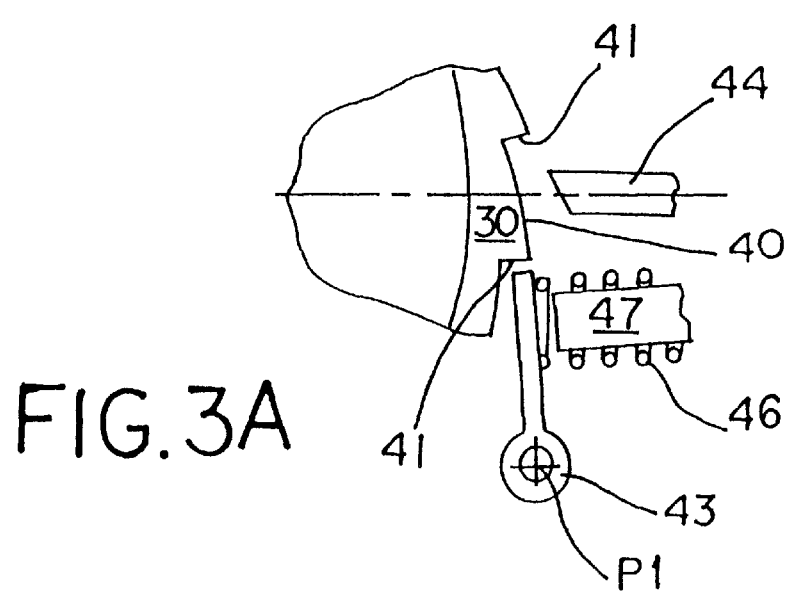
FIG. 3a is a schematic, fragmentary, sectional view of a ratchet mechanism of the present invention.

FIGS. 3a and 3b illustrate a device designed to slow down or stop the shear disk 30 in accordance to FIG. 1. The same components are labeled using the same reference numbers as used in the previous Figures. Shear disk 30 includes, in this embodiment also, oblong openings 39 that are open to the side, which partially encompass shear valves 50. Shear disk 30 is, in this version also, extended in radial direction. Shear disk 30 includes on the circumference 40 notches 41, positioned in radial or axial direction. Notches 41 can be designed in form of a sawtooth pattern. Engaged with notches 41 is at least one locking element, which can be in the form of a ratchet 43 or a locking bolt 44. Both possibilities are shown in FIG. 3a. The activation of locking bolt 44 occurs perpendicular to axis A of the transmission input shaft 11. When using ratchet 43 to slow down or lock shear disk 30, the locking action occurs by pivoting the ratchet 43 around a fixed pivot point P1. For this purpose, ratchet 43 is positioned radially off to the side as far as possible. Ratchet 43 is held in its position by use of pre-loaded springs 46. The activation of the ratchet 43, that is, the pivoting around P1, is accomplished by magnet 47. Correspondingly, the activation of locking bolt 44 can also be accomplished by magnet 47.

Figure 4:
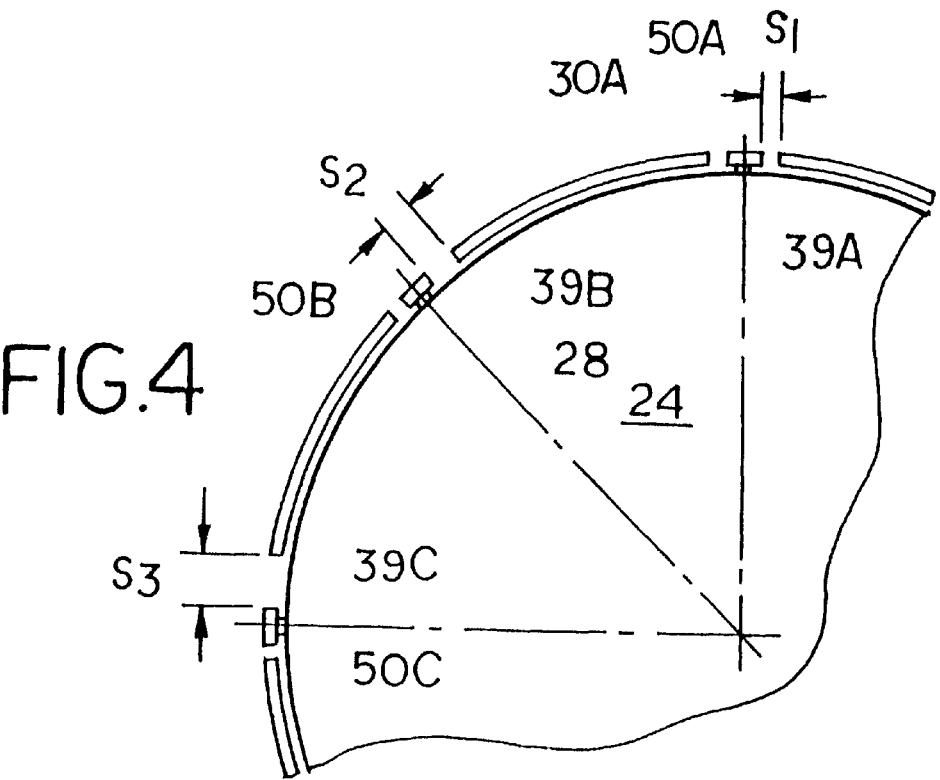
FIG. 4 is a fragmentary, front view of the shear disk of FIG. 2b along line I—I.

FIG. 4 illustrates a preferred embodiment of a shear disk, which can, for example, be applied to the relief mechanisms 31, which are depicted in FIGS. 2 and 3. The shear disk and coupling body are shown here in view I—I (ref. 2b). The coupling body 24 includes a plurality of supply drillings 28 (shown here by dash-point-dash lines), leading to the ring-shaped chamber 14. These drillings 28 are sealed by shear valves 50, or in this case, valves 50a, 50b, 50c. Shear disk 30a, which encompasses part of coupling body 24, includes oblong openings 39, which should be open to the side. The oblong openings 39, in this case, 39a through 39c, are made to different sizes, so that the distances $S_1$ through $S_3$ between the edges of the oblong openings 39 and the interface surfaces of the shear valves 50a through 50c—in direction of rotation—become increasingly larger. This has the result that valves 50 are sheared off in a sequential manner at relatively low force requirements.

Figure 5:
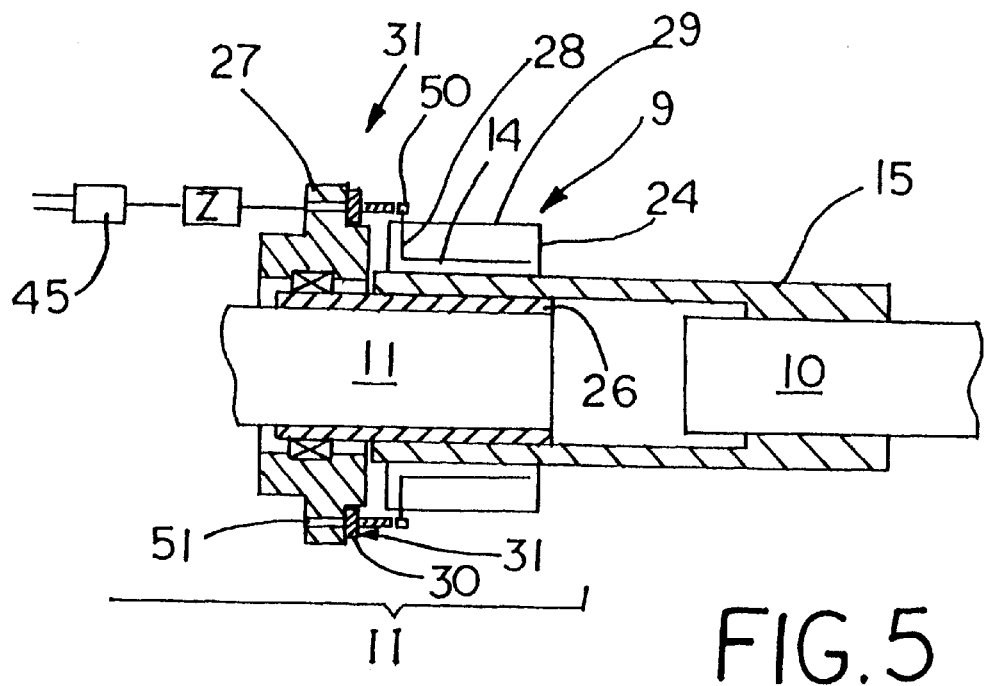
FIG. 5 is a schematic, side, sectional view of another embodiment of a relief mechanism, according to this invention, with an element such as a separator bolt, containing the explosive substance.

FIG. 5 illustrates, in accordance with the intent of this invention, a relief mechanism 31 for a safety coupling 9 using a shear disk 30 which is activated by use of a separator bolt (also shown in FIG. 1). The labeling used in this illustration is the same as used in the previous illustration. Safety coupling 9 connects the first part I of the drive system to the second part II, through the jamming of flange 15 of the first part I of the drive system against bushing 26, as well as against the transmission input shaft 11 of the transfer gearbox 8 of the second part II of the drive system.

To this end, the ring-shaped chamber 14 is pressurized with a medium. The ring-shaped chamber 14 utilizes supply drillings 28, which reside on the outside 29 of the coupling body 24 and extend in the radial direction to the ring-shaped chamber 14. The supply drillings 28 are sealed by sealing valves, also referred to as shear valves 50. Shear valves 50 protrude only minimally above the outer periphery 29 of coupling body 24. Mounted on bushing 26 is an element 27 carrying shear disk 30 of relief mechanism 31. The shear disk 30 is connected to element 27 in a torsionally rigid fashion, for example, by use of a splined shaft connection 55. Shear disk 30 is moveable in relation to bushing 27 in axial direction, parallel to the centerline of the drive shaft. Acting on shear disk 30 is at least one separator bolt in form of an explosive bolt 51. If several explosive bolts 51 are used, then these should be placed on the shear disk 30 on the same diameter and equally-spaced. The explosive bolts 51 are connected to an ignition device, which is linked to the output of a control device—not shown here—although it could be the same control device 45, as shown in FIG. 1. In response to the input signal, an output signal is initiated to trigger the ignition process, corresponding to the torque and disturbance values, which have been established.

Figure 6:
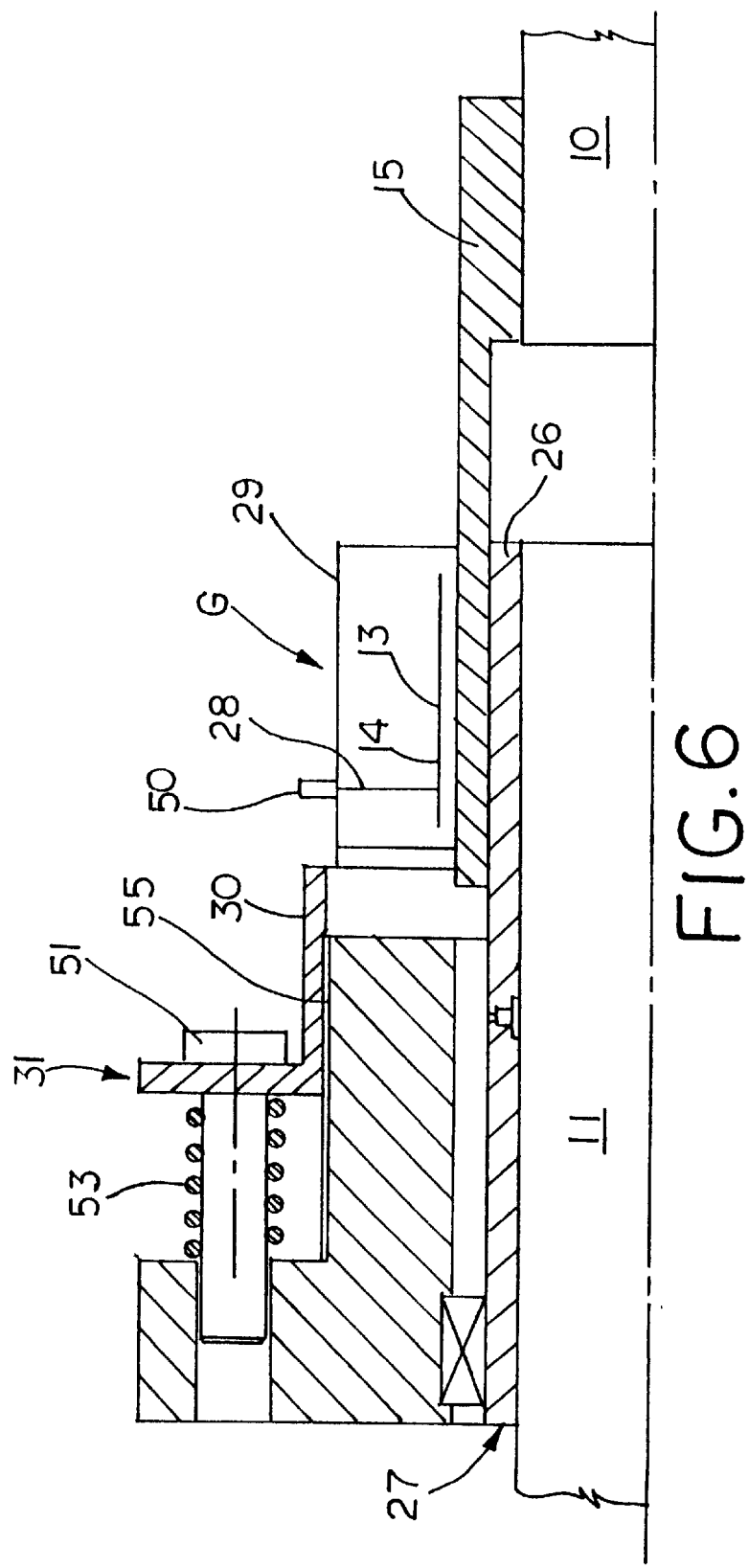
FIG. 6 is a partial, schematic, sectional side view of yet another embodiment of a relief mechanism, according to this invention, with a pre-loaded shear device.

FIG. 6 illustrates an additional embodiment that includes a shear disk 30 that is pre-loaded by spring 53. During normal operation, the shear disk is located in its position relative to the sealing valves 50 by use of separator bolts 51. In the event of an overload condition, the separator bolts 51 are fired, and the shear disk is accelerated in axial direction to shear off the valve heads of the sealing valves 50 of the safety coupling 9. "Dynamit Nobel" (a corporation) publishes the separator bolts 51 and the elements holding the explosive substances in various forms in brochures.

In terms of the placement of the separator bolts 51 in relation to the shear device, (preferable a shear disk 30) there are many other design alternatives. However, they all have one thing in common: upon recognition of a torque spike, a firing of the explosive substance occurs, generating an immediate force acting on the valve, which, in turn, causes the sealing valves to vent, triggering an interruption of the torque transmission by hydraulically jamming sleeves and bushings. More design variations are accorded to the expert's discretion, which is why these additional design variations are not further elaborated here.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A drive system for transferring power in a direction of power transfer from a power source, said drive system comprising:

a plurality of power take-off drivetrains;

a transfer gearbox disposed upstream from said drivetrains relative to the direction of power transfer;

a control device configured for processing an acquired value of at least one of a torque on said power take-off drivetrains, a value proportional to the torque which is assigned to each said power take-off drivetrain, and a disturbance value, said disturbance value quantifying a disturbance originating nearby; and a protection device configured for protecting against a torque overload condition in at least one of said drivetrains, said protection device including a single safety coupling disposed upstream from said transfer gearbox relative to the direction of power transfer, said safety coupling having:

a relief mechanism connected to said control device;

an activating device configured for activating said relief mechanism upon at least one of the torque, the value proportional to the torque, and the disturbance value being exceeded; and a coupling body configured for achieving a non-positive connection between two machine components, said coupling body being configured to limit thereto deformations needed to achieve the non-positive connection and to thereby avoid deformations to said two machine components, said coupling body including at least one thin-walled sleeve partially defining a ring-shaped pressurizable chamber, said coupling body also including at least one supply drilling extending through said coupling body to said ring-shaped chamber, said at least one supply drilling being configured for being sealed with sealing valves in a fluid-tight manner.

2. The drive system of claim 1, wherein said power take-off drivetrains include a plurality of sensing/acquisition devices, said safety coupling including a control device having at least one input linked to at least one of an ambient environment and said sensing/acquisition devices, said control device having at least one output configured for sending an activation signal to said relief mechanism.

3. The drive system of claim 1, wherein said power take-off drivetrains include a plurality of sensing/acquisition devices, said safety coupling including a converter coupled to said sensing/acquisition devices, said converter being configured for converting signals from said sensing/acquisition devices into an activation signal for triggering said relief mechanism.

4. The drive system of claim 1, wherein the value proportional to the torque comprises an operating parameter of said power take-off drivetrains.

5. The drive system of claim 1, wherein the value proportional to the torque comprises an operating parameter of a material to be processed.

6. The drive system of claim 1, wherein the disturbance value comprises a value for current vibrations in a foundation of said drive system.

7. The drive system of claim 1, wherein said relief mechanism includes a shear device configured for acting upon said sealing valves, said shear device being freely rotatable relative to said coupling body.

8. The drive system of claim 7, wherein said shear device comprises a shear disk including a plurality of openings, said openings at least partially encompassing said sealing valves.

9. The drive system of claim 8, wherein said openings have different widths.

10. The drive system of claim 8, wherein said shear device includes a brake device.

11. The drive system of claim 10, wherein said brake device comprises a disk brake device, said shear disk including two ring-shaped extensions having two working surfaces configured for engaging said disk brake device.

12. The drive system of claim 7, wherein said shear device includes:

a shear disk including a ring-shaped radial extension having a peripheral edge with a plurality of notches; and a brake device having an engaging device configured for engaging said notches upon activation of said relief mechanism.

13. The drive system of claim 12, further comprising a pre-loaded spring element configured for holding said engaging device in a fixed position, said engaging device including a magnet configured for generating a force counteracting said pre-loaded spring element upon activation of said relief mechanism.

14. The drive system of claim 12, wherein said coupling body includes a center line, said engaging device including a locking bolt configured for sliding into said notches in a direction substantially parallel to said center line of said coupling body.

15. The drive system of claim 12, wherein said engaging device comprises a ratchet, said ratchet being pivotable about a fixed pivot point.

16. The drive system of claim 1, wherein said relief mechanism includes:

a shear device configured for acting upon said sealing valves; and at least one machine element containing an explosive substance and configured for acting directly upon said sealing valves, each said machine element being connected to said control device;

wherein said safety coupling includes an ignition device configured for igniting said explosive substance upon one of the torque and the value proportional to the torque being exceeded.

17. The drive system of claim 16, wherein said shear device comprises a shear disk.

18. The drive system of claim 17, wherein said shear disk is pre-loaded.

19. The drive system of claim 16, further comprising a drive shaft torsionally rigidly connected to said shear device, said shear device being movable in an axial direction.

20. The drive system of claim 1, further comprising a plurality of sensing/acquisition devices, said control device comprising an electronic coupling device interconnecting said relief mechanism and said sensing/acquisition devices.

* * * * *